United States Patent
Hu et al.

(10) Patent No.: US 9,998,378 B2
(45) Date of Patent: Jun. 12, 2018

(54) TRAFFIC CONTROL METHOD, DEVICE, AND NETWORK

(71) Applicant: Huawei Technologies Co., Ltd., Shenzhen (CN)

(72) Inventors: Xing Hu, Shenzhen (CN); Xiaojun Shen, Shenzhen (CN); Zhiyun Chen, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 133 days.

(21) Appl. No.: 14/668,621

(22) Filed: Mar. 25, 2015

(65) Prior Publication Data
US 2015/0200856 A1   Jul. 16, 2015

Related U.S. Application Data

(63) Continuation of application No. PCT/CN2012/081892, filed on Sep. 25, 2012.

(51) Int. Cl.
*H04L 12/801* (2013.01)
*H04L 12/26* (2006.01)
(Continued)

(52) U.S. Cl.
CPC ........ *H04L 47/122* (2013.01); *H04L 43/0894* (2013.01); *H04L 47/10* (2013.01);
(Continued)

(58) Field of Classification Search
CPC ....... H04L 47/11; H04L 47/10; H04L 43/0876
(Continued)

(56) References Cited

U.S. PATENT DOCUMENTS

| 7,945,945 B2 | 5/2011 | Graham et al. |
| 2002/0065992 A1* | 5/2002 | Chauvel ............. G06F 1/206 711/141 |

(Continued)

FOREIGN PATENT DOCUMENTS

| CN | 1430379 A | 7/2003 |
| CN | 101253729 A | 8/2008 |

(Continued)

OTHER PUBLICATIONS

"Draft Standard for Local and Metropolitan Area Networks—Amendment 7 to 802.1Q; Virtual Bridged Local Area Networks: Congestion Notification," IEEE P802.1Qau/D2.4, Oct. 28, 2009, 119 pages.

(Continued)

*Primary Examiner* — Asad Nawaz
*Assistant Examiner* — Jason Harley
(74) *Attorney, Agent, or Firm* — Slater Matsil, LLP

(57) ABSTRACT

A traffic control method and device are provided. The method includes receiving traffic monitoring information of a first service flow reported by a reaction point RP; when a congestion state of a first service flow of a congestion point CP satisfies a congestion condition, determining a reaction point RP needing traffic adjustment from a designated reaction point RP according to the received traffic monitoring information, and calculating, according to the traffic monitoring information, a new traffic value of a first service flow of each of the reaction point RP needing traffic adjustment; sending each calculated new traffic value of a first service flows to a corresponding reaction point RP needing traffic adjustment, so that the reaction point RP performs traffic control on the first service flow of the reaction point RP according to the new traffic value.

20 Claims, 3 Drawing Sheets

---

Receive traffic monitoring information of a first service flow reported by an RP — 201

Determine an RP needing traffic adjustment from a designated RP, and calculate, according to the traffic monitoring information, a new traffic value of a first service flow of each of the RP needing traffic adjustment — 202

Send each calculated new traffic value of a first service flow to a corresponding RP needing traffic adjustment, so that the RP performs traffic control on the first service flow of the RP according to the new traffic value — 203

(51) Int. Cl.
*H04L 12/851* (2013.01)
*H04L 12/803* (2013.01)
*H04L 12/825* (2013.01)

(52) U.S. Cl.
CPC ............ *H04L 47/11* (2013.01); *H04L 47/263* (2013.01); *H04L 43/0876* (2013.01); *Y02D 50/10* (2018.01)

(58) Field of Classification Search
USPC .................................................. 370/229, 252
See application file for complete search history.

(56) References Cited

U.S. PATENT DOCUMENTS

| | | | |
|---|---|---|---|
| 2007/0081454 A1* | 4/2007 | Bergamasco | H04L 47/10 370/229 |
| 2007/0153695 A1* | 7/2007 | Gholmieh | H04L 43/0882 370/235 |
| 2008/0298248 A1 | 12/2008 | Roeck et al. | |
| 2009/0052326 A1 | 2/2009 | Bergamasco et al. | |
| 2009/0180380 A1 | 7/2009 | Prabhakar et al. | |
| 2013/0070600 A1* | 3/2013 | Nakajima | H04L 47/762 370/235 |
| 2013/0124753 A1* | 5/2013 | Ansari | H04L 47/263 709/235 |
| 2013/0279340 A1* | 10/2013 | Nakash | H04L 47/2483 370/237 |
| 2013/0315065 A1* | 11/2013 | Matsuike | H04L 47/33 370/236 |
| 2014/0022901 A1* | 1/2014 | Suzuki | H04L 49/15 370/235 |

FOREIGN PATENT DOCUMENTS

| | | |
|---|---|---|
| CN | 102025617 A | 4/2011 |
| WO | 2007050250 A2 | 5/2007 |
| WO | 2008148122 A2 | 12/2008 |
| WO | 2010117358 A1 | 10/2010 |

OTHER PUBLICATIONS

Jiang, J., et al., "Analysis of Backward Congestion Notification (BCN) for Ethernet in Datacenter Applications," IEEE INFOCOM 2007, 26th IEEE International Conference on Computer Communications, May 6-12, 2007, pp. 2456-2460.

* cited by examiner

TRAFFIC CONTROL METHOD, DEVICE, AND NETWORK

This application is a continuation of International Application No. PCT/CN2012/081892, filed on Sep. 25, 2012, which is hereby incorporated by reference in its entirety.

TECHNICAL FIELD

This application relates to the field of communications, and in particular, to a traffic control method, device, and network.

BACKGROUND

Due to factors such as open standard, high performance, low price, and being supported by many manufacturers, an Ethernet technology triumphs over technologies such as token-ring, FDDI (Fiber Distributed Data Interface), and ATM (Asynchronous Transfer Mode), and becomes a versatile interface for a LAN technology. With the emerging of new services and new applications using the Ethernet technology, how to ensure end-to-end QoS (Quality of Service) of a network application has become a biggest challenge faced by the Ethernet technology.

In order to solve this problem, the IEEE defines a congestion notification (CN) method in the 802.1Qau standard, so as to implement end-to-end traffic control of the Ethernet and improve an end-to-end QoS capability of the Ethernet.

In the CN method, first a congestion point (CP) and a reaction point (RP) in an Ethernet switch network need to be configured, as shown in FIG. 1, where a certain Ethernet switch in an Ethernet switch network is configured to a CP, and other nodes connected to the Ethernet switch are configured to RPs, and one CP corresponds to multiple RPs at the edge of the network. As shown in FIG. 1, a connecting line with two round endpoints between two nodes (for example, between an RP point and an RP point and between a CP point and an RP) in the figure represents a physical link between the nodes. In FIG. 1, a line with an arrow from a CP point to an RP point represents a transfer direction of control information.

For each data stream, a CP calculates feedback information (Fb) according to a queue length and a queue growth rate of an egress port of the data stream, and if Fb<0, it indicates that a queue congestion probability of the egress port of the data stream is increased, and the CP randomly selects a frame of packet from received subsequent packets of the data stream at a certain probability P, and sends control information to a RP that sends the fame of packet, where the control information includes information such as Fb and a congestion point ID; and after receiving the control information, the RP decreases a sending rate of the data stream according to a certain algorithm such as a method of decrement in proportion, and when no new control information is received in a set fixed period, increases the sending rate of the data stream, till an upper limit of the sending rate of the data stream is reached. The foregoing process is repeated continuously, thereby implementing network-level traffic control of the Ethernet.

The applicant finds that Ethernet traffic control performance of an existing Ethernet traffic control method is poor.

SUMMARY

In view of this, a technical problem to be solved in this application is to provide a traffic control method, device, and network, so that network traffic control performance can be improved.

Accordingly, embodiments of this application adopt a number of technical solutions.

According to a first aspect of the embodiments of this application, a traffic control method is disclosed and includes receiving traffic monitoring information of a first service flow reported by a reaction point (RP). When a congestion state of a first service flow of a congestion point (CP) satisfies a congestion condition, an RP needing traffic adjustment is determined from one or more designated RPs according to the received traffic monitoring information of the first service flow reported by the RP. A new traffic value of a first service flow of each of the RP needing traffic adjustment is calculated according to the traffic monitoring information. The designated RP has a traffic monitoring function. Each calculated new traffic value of a first service flow is sent to a corresponding RP needing traffic adjustment, so that the RP performs traffic control on the first service flow of the RP according to the new traffic value.

In a first possible implementation manner of the first aspect, the determining an RP needing traffic adjustment from one or more designated RPs according to the received traffic monitoring information of the first service flow reported by the RP includes selecting a preset number of RPs from the designated RP according to a priority, and using the selected preset number of RPs as the RP needing traffic adjustment; or selecting RPs of a preset ratio of the total number of designated RPs from the designated RP according to a priority, and using the selected RPs of the preset ratio as the RP needing traffic adjustment.

In a second possible implementation manner of the first aspect, the designated RP is an RP that is configured with both a committed information rate CIR value and a peak information rate PIR value.

In a third possible implementation manner of the first aspect, the determining an RP needing traffic adjustment from one or more designated RPs according to the received traffic monitoring information of the first service flow reported by the RP includes, for each designated RP, determining whether traffic of a first service flow of the RP is greater than a CIR of the RP, and selecting an RP with traffic of the first service flow greater than the CIR as the RP needing traffic adjustment.

In a fourth possible implementation manner of the first aspect, the traffic monitoring information includes: a cache status of a queue corresponding to the first service flow of the RP; and the determining an RP needing traffic adjustment according to the received traffic monitoring information of the first service flow reported by the RP includes, from the RP that reports the traffic monitoring information of the first service flow, selecting an RP with a cache status of a queue being overflowing as the RP needing traffic adjustment.

In a fifth possible implementation manner of the first aspect, the traffic monitoring information includes: traffic of the first service flow; and the calculating, according to the traffic monitoring information, a new traffic value of a first service flow of each of the RP needing traffic adjustment includes calculating a ratio of an inflow rate of the first service flow to a maximum outbound bandwidth of the first service flow in the CP, calculating a product of traffic reported by the RP needing traffic adjustment and the ratio, and using the product as a new traffic value of a first service flow of the RP needing traffic adjustment; or calculating a first difference between a maximum outbound bandwidth of the first service flow of the CP and a sum of traffic of first service flows of all non-designated RPs, and calculating a second difference between an inflow rate of the first service flow of the CP and the sum of the traffic of the first service flows of all the non-designated RPs, calculating a ratio of the first difference to the second difference, and using a product, which is obtained by multiplying traffic reported by the RP needing traffic adjustment by the ratio, as a new traffic value of a first service flow of the RP needing traffic adjustment.

In a sixth possible implementation manner of the first aspect, the traffic monitoring information of the first service flow is transmitted through out-of-band signaling or a low-delay packet; and/or a new traffic parameter of the first service flow is transmitted through out-of-band signaling or a low-delay packet.

In a seventh possible implementation manner of the first aspect, the RP performs traffic control on the first service flow of the RP according to the new traffic value, which includes decreasing, by the RP, traffic of the first service flow to the new traffic value.

In an eighth possible implementation manner of the first aspect, the RP performs traffic control on the first service flow of the RP according to the new traffic value, which includes configuring a committed information rate CIR and/or a peak information rate PIR of the RP to the new traffic value.

According to a second aspect of the embodiments of this application, a traffic control device is disclosed and includes a number of units. A receiving unit is configured to receive traffic monitoring information of a first service flow reported by a reaction point RP. A calculation unit is configured to, when a congestion state of a first service flow of a congestion point CP satisfies a congestion condition, determine an RP needing traffic adjustment from one or more designated RPs according to the received traffic monitoring information of the first service flow reported by the RP and to calculate, according to the traffic monitoring information received by the receiving unit, a new traffic value of a first service flow of each of the RP needing traffic adjustment, where the designated RP has a traffic monitoring function. A sending unit is configured to send each new traffic value of a first service flow calculated by the calculation unit to a corresponding RP needing traffic adjustment, so that the RP performs traffic control on the first service flow of the RP according to the new traffic value.

In a first possible implementation manner of the second aspect, the calculation unit includes a first selection sub-unit, configured to select a preset number of RPs from the designated RP according to a priority, and use the selected preset number of RPs as the RP needing traffic adjustment; or a second selection sub-unit, configured to select RPs of a preset ratio of the total number of designated RPs from the designated RP according to a priority, and use the selected RPs of the preset ratio as the RP needing traffic adjustment.

In a second possible implementation manner of the second aspect, the designated RP is an RP that is configured with both a committed information rate CIR value and a peak information rate PIR value.

In a third possible implementation manner of the second aspect, the calculation unit includes a third selection sub-unit, configured to, for each designated RP, determine whether traffic of a first service flow of the RP is greater than a CR of the RP, and select an RP with traffic of the first service flow greater than the CIR as the RP needing traffic adjustment.

In a fourth possible implementation manner of the second aspect, the traffic monitoring information includes: a cache status of a queue corresponding to the first service flow of the RP; and the calculation unit includes a fourth selection sub-unit, configured to, from the RP that reports the traffic monitoring information of the first service flow, select an RP with a cache status of a queue being overflowing as the RP needing traffic adjustment.

In a fifth possible implementation aspect of the second aspect, the traffic monitoring information includes: traffic of the first service flow; and the calculation unit further includes a first calculation sub-unit, configured to calculate a ratio of an inflow rate of the first service flow to a maximum outbound bandwidth of the first service flow in the CP, calculate a product of traffic reported by the RP needing traffic adjustment and the ratio, and use the product as a new traffic value of a first service flow of the RP needing traffic adjustment; or a second calculation sub-unit, configured to calculate a first difference between a maximum outbound bandwidth of the first service flow of the CP and a sum of traffic of first service flows of all non-designated RPs, and calculate a second difference between an inflow rate of the first service flow of the CP and the sum of the traffic of the first service flows of all the non-designated RPs, calculate a ratio of the first difference to the second difference, and use a product, which is obtained by multiplying traffic reported by the RP needing traffic adjustment by the ratio, as a new traffic value of a first service flow of the RP needing traffic adjustment.

According to a third aspect of the embodiments of this application, a data exchange network is disclosed. The network includes an RP and a CP. The RP is configured to report traffic monitoring information of a first service flow to the CP and to receive a new traffic value of the first service flow sent by the CP, and to perform traffic control on the first service flow of the RP according to the new traffic value. The CP is configured to receive the traffic monitoring information of the first service flow reported by the RP. When a congestion state of a first service flow of the CP satisfies a congestion condition, the CP is configured to determine an RP needing traffic adjustment from one or more designated RPs according to the received traffic monitoring information of the first service flow reported by the RP, and to calculate, according to the traffic monitoring information, a new traffic value of a first service flow of each of the RP needing traffic adjustment, where the designated RP has a traffic monitoring function and to send each calculated new traffic value of a first service flow to a corresponding RP needing traffic adjustment, so that the RP performs traffic control on the first service flow of the RP according to the new traffic value.

In various embodiments, traffic monitoring information of a first service flow reported by an RP is received. When a congestion state of a first service flow of a CP satisfies a congestion condition, an RP needing traffic adjustment is determined from one or more designated RPs according to the received traffic monitoring information of the first service flow reported by the RP, and a new traffic value of a first service flow of each of the RP needing traffic adjustment is calculated according to the traffic monitoring information, where the designated RP has a traffic monitoring function. Each calculated new traffic value of a first service flow is sent to a corresponding RP needing traffic adjustment, so that the RP performs traffic control on the first service flow of the RP according to the new traffic value.

In this way, in the embodiments of this application, an RP needing traffic adjustment is selected only from one or more designated RPs, and compared with randomly selecting an RP in the prior art, the selected RP needing traffic adjustment is more accurate, thereby improving network traffic control performance; moreover, a new traffic value of a first service flow of each of the RP needing traffic adjustment is calculated according to the traffic monitoring information, so that the RP performs traffic control on the first service flow of the RP according to the new traffic value, and compared with that the selected RP decreases traffic according to a certain fixed algorithm in the prior art, traffic control in the RP is more accurate, and at the same time, the network traffic control performance is improved.

DETAILED DESCRIPTION OF ILLUSTRATIVE EMBODIMENTS

In the prior art, when Ethernet traffic control is performed, a CP randomly selects a frame of packet, and sends control information to an RP that sends the frame of packet, but it cannot be ensured that the RP that sends the frame of packet is an RP that causes data stream congestion. Therefore, the RP that sends the frame of packet decreases a sending rate of a data stream, which may not solve a problem of data stream congestion, thereby influencing Ethernet traffic control performance.

Based on this, embodiments of this application provide a traffic control method, device and network, so that network traffic control performance can be improved. The method provided in the embodiments of this application is applicable to a data exchange network, for example, the Ethernet, an IP (Internet protocol) network, or an OTN (optical transport network) network, and in the foregoing network, data is forwarded and exchanged in the form of a data packet. The network includes a congestion point CP and a reaction point RP.

Figure 1:
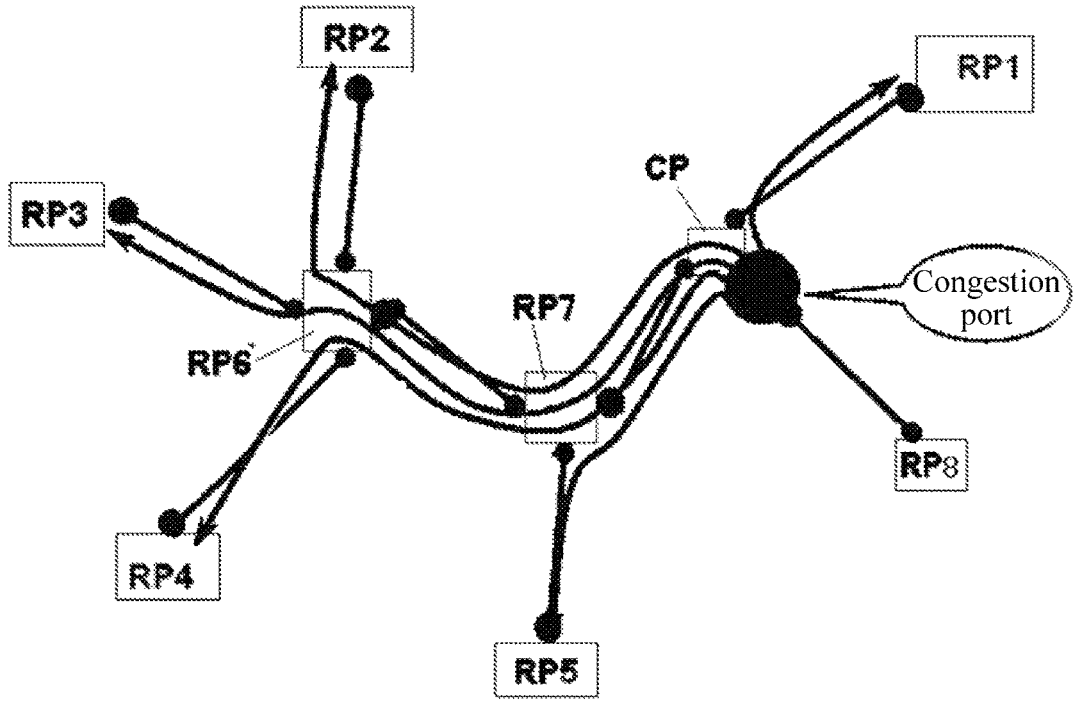
FIG. 1 is a schematic diagram of a CN technology in the prior art.
Figure 2:
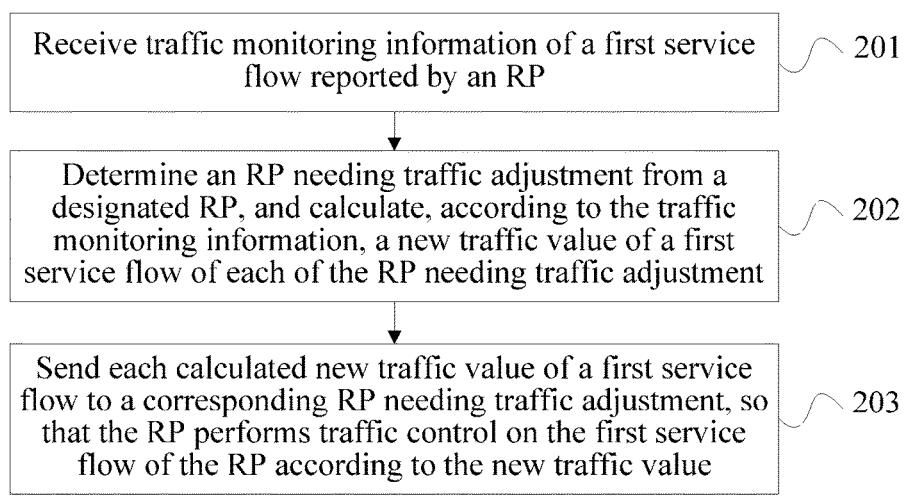
FIG. 2 is a schematic diagram of a traffic control method according to a first embodiment of this application.

FIG. 2 is a schematic diagram of a traffic control method according to a first embodiment of this application, and this method is applicable to a CP. As shown in FIG. 2, the method includes the following steps.

Step 201: Receive traffic monitoring information of a first service flow reported by an RP.

Step 202: When a congestion state of a first service flow of a CP satisfies a congestion condition, determine an RP needing traffic adjustment from one or more designated RPs according to the received traffic monitoring information of the first service flow, and calculate, according to the traffic monitoring information, a new traffic value of a first service flow of each of the RP needing traffic adjustment, where the designated RP has a traffic monitoring function.

Step 203: Send each calculated new traffic value of a first service flow to a corresponding RP needing traffic adjustment, so that the RP performs traffic control on the first service flow of the RP according to the new traffic value.

In the traffic control method shown in FIG. 2, when a congestion state of a first service flow of a CP satisfies a congestion condition, an RP needing traffic adjustment is determined from one or more designated RPs according to received traffic monitoring information of a first service flow reported by a reaction point RP, and a new traffic value of a first service flow of each of the RP needing traffic adjustment is calculated according to the traffic monitoring information, where the designated RP has a traffic monitoring function; and each calculated new traffic value of a first service flow is sent to a corresponding RP needing traffic adjustment, so that the RP performs traffic control on the first service flow of the RP according to the new traffic value. In this way, in the embodiment of this application, an RP needing traffic adjustment is selected only from one or more designated RPs, and compared with randomly selecting an RP in the prior art, the selected RP needing traffic adjustment is more accurate, thereby improving network traffic control performance; moreover, a new traffic value of a first service flow of each of the RP needing traffic adjustment is calculated according to the traffic monitoring information, so that the RP performs traffic control on the first service flow of the RP according to the new traffic value, and compared with that the selected RP decreases traffic according to a certain fixed algorithm in the prior art, traffic control in the RP is more accurate, and at the same time, the network traffic control performance is improved.

Figure 3:
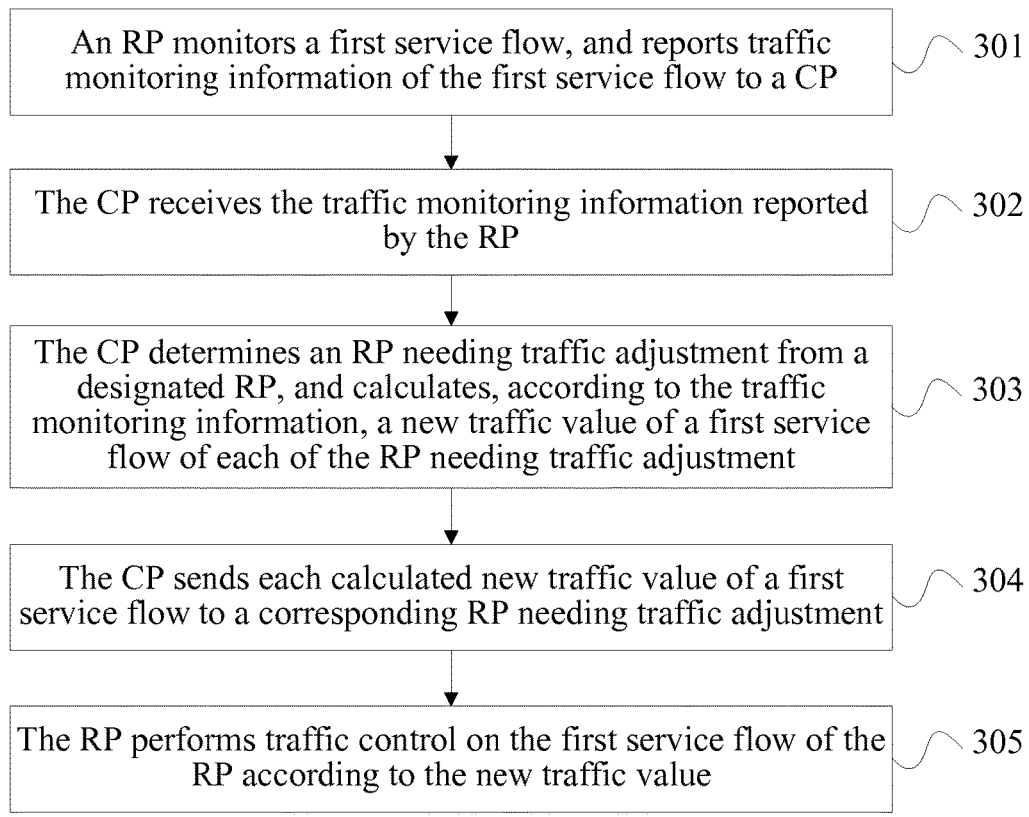
FIG. 3 is a schematic diagram of a traffic control method according to a second embodiment of this application.

FIG. 3 is a schematic diagram of a traffic control method according to a second embodiment of this application. As shown in FIG. 3, the method includes:

Step 301: An RP monitors a first service flow, and reports traffic monitoring information of the first service flow to a CP.

The RP is an RP having a traffic monitoring function in a network, and may be all RPs or a part of RPs in the network. Specifically, which RPs report traffic monitoring information of a first service flow may be preset in specific implementation, which is not limited herein.

The first service flow refers to any service flow among all service flows or a pre-designated service flow.

The traffic monitoring information includes: current traffic and a current queue cache status of the first service flow of the RP. The current refers to a moment at which the RP reports the first service flow to the CP. The current queue cache status includes: statuses such as overflowing and normal.

Herein, the RP may actively or periodically report the traffic monitoring information of the first service flow to the CP. Two examples are provided.

(1) When the RP actively reports the traffic monitoring information of the first service flow to the CP, a traffic threshold and/or queue cache status threshold of the first service flow may be preset in the RP, so that the reporting the traffic monitoring information of the first service flow to the CP may include, when the RP detects that traffic of the first service flow exceeds the traffic threshold, and/or, the RP detects that a queue cache status of the first service flow exceeds the queue cache status threshold, reporting the traffic monitoring information of the first service flow to the CP.

(2) When the RP periodically reports the traffic monitoring information of the first service flow to the CP, a reporting period may be preset in the RP, so that the reporting the traffic monitoring information of the first service flow to the CP may include, when each reporting period arrives, reporting, by the RP, the traffic monitoring information of the first service flow to the CP.

In order to reduce a delay that the RP reports the traffic monitoring information, the traffic monitoring information may be carried in out-of-band signaling or a low-delay packet, so that traffic control information is transported to the CP through the out-of-band signaling or the low-delay packet.

Step 302: The CP receives the traffic monitoring information reported by the RP.

Step 303: When a congestion state of a first service flow of the CP satisfies a congestion condition, the CP determines an RP needing traffic adjustment from one or more designated RPs, and calculates, according to the traffic monitoring information, a new traffic value of a first service flow of each of the RP needing traffic adjustment, where the designated RP is an RP having a traffic monitoring function.

The congestion condition includes that: a cache queue of the first service flow is overflowing or an inflow rate of the first service flow is greater than a maximum outbound bandwidth of the first service flow, or a length of a cache queue of the first service flow is greater than a preset length threshold, or an inflow rate of the first service flow is greater than a preset rate threshold.

Specifically, the CP determines whether the congestion state of the first service flow satisfies the congestion condition, which may include that: the CP determines, according to information obtained by the CP, whether the congestion state of the first service flow satisfies the congestion condition; or the CP determines, according to the traffic monitoring information reported by the RP, whether the congestion state of the first service flow satisfies the congestion condition.

In specific implementation, the CP determines, according to the information obtained by the CP, whether the congestion state of the first service flow satisfies the congestion condition, which may include that: the CP determines whether a cache queue of the CP is overflowing currently, or the CP determines whether a length of a current cache queue of the CP is greater than a preset length threshold. When the CP determines that a cache queue is overflowing currently or a length of a current cache queue is greater than the preset length threshold, the CP determines that the congestion state of the first service flow satisfies the congestion condition.

Another possible implementation manner is that, the CP determines, according the traffic monitoring information reported by the RP, whether the congestion state of the first service flow satisfies the congestion condition. The traffic monitoring information reported by the RP may include current traffic and a current queue cache status of the first service flow of the RP. In specific implementation, when the CP determines, according to a current queue cache status reported by the RP, that a cache queue is overflowing currently in the RP or a length of a current cache queue of the RP is greater than the preset length threshold, the CP determines that the congestion state of the first service flow satisfies the congestion condition. Or, when the CP determines, according to current traffic information of the first service flow reported by the RP, that an inflow rate of the first service flow is greater than a maximum outbound bandwidth of the first service flow or an inflow rate of the first service flow is greater than a preset rate threshold, the CP determines that the congestion state of the first service flow satisfies the congestion condition.

Specific values of the length threshold and the rate threshold may be set autonomously in an actual application, which is not limited herein. The CP may pre-store configuration information about a CIR (Committed Information Rate) and a PIR (Peak Information Rate) of a first data stream of each RP. For example, information shown in Table 1 is recorded in the form of a table or a data table.

TABLE 1

| RP Identity | CIR | PIR |
|---|---|---|
| RP1 | 15M | 40M |
| RP2 | 25M | |
| RP3 | 25M | |
| RP4 | 15M | 40M |

The CP may obtain, by searching for a CIR and a PIR of each RP recorded in Table 1, whether the CIR and the PIR of the first data stream of each RP recorded in Table 1 are configured, and obtain specific configured values. For example, an RP1 and an RP4 in Table 1 are configured with both a CIR and a PIR, while an RP2 and an RP3 are configured with only a CIR, but not configured with a PIR. Therefore, the RP2 and the RP3 are not configured with both the CIR and the PIR.

In an actual application, if RPs are configured with only a CIR, it indicates that a traffic change of a first data stream of these RPs is small and it must be ensured that a bandwidth equal to a CIR value of the data stream is provided, and for these RPs, a traffic value of a first service flow does not need to be adjusted.

In practice, in step 301, when it is set that a part of RPs report the traffic monitoring information of the first service flow, when the part of the RPs are selected, an RP that is configured with both a CIR and a PR may be selected, that is, the designated RP or a part of RPs among designated RPs.

The determining an RP needing traffic adjustment from one or more designated RPs may include selecting a preset number of RPs from the designated RP according to a priority, and using the selected preset number of RPs as the RP needing traffic adjustment; or selecting RPs of a preset ratio of the total number of designated RPs from the designated RP according to a priority, and using the selected RPs of the preset ratio as the RP needing traffic adjustment.

In an embodiment, the designated RP is an RP that is configured with a CIR value and a PIR value, that is, in addition that the designated RP has a traffic monitoring function, and the designated RP is further configured with a CIR value and a PIR value. In this embodiment, the determining an RP needing traffic adjustment from one or more designated RPs may include, for each designated RP, determining whether traffic of a first service flow of the RP is greater than a CR of the RP, and selecting an RP with traffic of the first service flow greater than the CR as the RP needing traffic adjustment.

In the embodiment of the present invention, the designated RP is an RP having a traffic monitoring function. The RP having a traffic monitoring function refers to an RP than can monitor its own traffic, and can report traffic monitoring information of a service flow to the CP.

The selecting a preset number of RPs from the designated RP according to a priority or selecting RPs of a preset ratio of the total number of designated RPs from the designated RP according to a priority may specifically include: selecting an RP from the designated RP according to a priority of the RP or selecting an RP from the designated RP according to a priority of a service flow.

In specific implementation, the selecting an RP from the designated RP according to a priority of the RP specifically is: performing priority sorting according to the number of cross service flows of each RP, where an RP with the greater number of cross service flows has a higher priority, and the RP with the greater number of cross service flows is preferentially adjusted. Because for an RP through which multiple service flows pass, congestion is often easily caused, it is preferentially adjusted as an RP needing traffic adjustment, so that network traffic control performance may be effectively improved.

In specific implementation, the selecting an RP from the designated RP according to a priority of a service flow specifically is: preferentially adjusting an RP having a service flow of a lower priority. In the Ethernet, priorities of service flows are preset, a service flow of a higher priority always requires higher bandwidth quality and low-delay transmission; therefore, when determining an RP needing traffic adjustment, an RP having a service flow of a lower priority is preferentially adjusted.

Specific values of the preset number and the preset ratio are not limited herein, and may be autonomously set in an actual application.

The traffic monitoring information includes a cache status of a queue corresponding to the first service flow of the RP; and the determining an RP needing traffic adjustment from one or more designated RPs may include, from the RP that reports the traffic monitoring information of the first service flow, selecting an RP with a cache status of a queue being overflowing as the RP needing traffic adjustment.

The traffic monitoring information includes: traffic of the first service flow; and the calculating, according to the traffic monitoring information, a new traffic value of a first service flow of each of the RP needing traffic adjustment includes calculating a ratio of an inflow rate of the first service flow to a maximum outbound bandwidth of the first service flow in the CP, calculating a product of traffic reported by the RP needing traffic adjustment and the ratio, and using the product as a new traffic value of a first service flow of the RP needing traffic adjustment.

For example, it is assumed that a network includes 4 RPs recorded in Table 1, and a maximum outbound bandwidth of a first service flow of the CP is 100 Mbps. It is assumed that traffic of a first service flow reported by the RP1 is 30 M, traffic of a first service flow reported by the RP4 is 30 M, and a sum of traffic of first service flows of the four RPs is 25+25+30+30=110, which is greater than the maximum outbound bandwidth 100 Mbps; therefore, a new traffic value of the RP1 is equal to 30×100/110=27 M, and in the same way, a new traffic value of the RP4 is also equal to 27 M.

Or, the calculating, according to the traffic monitoring information, a new traffic value of a first service flow of each of the RP needing traffic adjustment may include calculating a first difference between a maximum outbound bandwidth of the first service flow of the CP and a sum of traffic of first service flows of all non-designated RPs, and calculating a second difference between an inflow rate of the first service flow of the CP and the sum of the traffic of the first service flows of all the non-designated RPs, calculating a ratio of the first difference to the second difference, and using a product, which is obtained by multiplying traffic reported by the RP needing traffic adjustment by the ratio, as a new traffic value of a first service flow of the RP needing traffic adjustment.

Still taking the foregoing example as an example, the first difference=100−25−25=50; the second difference=110−25−25=60; a new traffic value of the RP1=30×50/60=25; and in the same way, a new traffic value of the RP4 is also equal to 25 M.

In addition, in an actual application, a weight corresponding to each RP may further be calculated according to a CIR value of each of the RP needing traffic adjustment, a product obtained by multiplying the traffic reported by the RP needing traffic adjustment by a corresponding weight is used as a new traffic value of a first service flow of the RP needing traffic adjustment, and details are not described herein again.

Step 304: The CP sends each calculated new traffic value of a first service flow to a corresponding RP needing traffic adjustment.

In the prior art, the CP generally sends control information to a selected RP through a data frame, while a data frame carrying the control information is forwarded hop by hop to a destination RP through a network by adopting a same forwarding manner as a common data frame, and a forwarding delay of the data frame is long and is not fixed, thereby causing that a delay that the destination RP receives the data frame carrying the control information is long, and correspondingly, a delay of reducing a sending rate of a data stream according to the control information is long; therefore, time that the destination RP performs traffic control is lagged far behind a moment at which congestion occurs, which also influences Ethernet traffic control performance.

Based on this, in the embodiment of the present invention, in order to reduce a transmission delay generated when the CP transmits the new traffic value to the RP, the new traffic value may also be carried in out-of-band signaling or a low-delay packet, so that traffic control information is sent to the RP through the out-of-band signaling or the low-delay packet, thereby reducing a transmission delay of the new traffic value between the CP and the RP, and further improving the network traffic control performance.

Step 305: The RP performs traffic control on the first service flow of the RP according to the new traffic value.

The RP performs traffic control on the first service flow of the RP according to the new traffic value, which includes decreasing, by the RP, traffic of the first service flow to the new traffic value.

When the designated RP is an RP that is configured with a CR value and a PIR value, the RP performs traffic control on the first service flow of the RP according to the new traffic value, which configuring a CR and/or a PIR of the RP to the new traffic value.

Compared with the embodiment of this application shown in FIG. 2, with the Ethernet traffic control method shown in FIG. 3, traffic control information and/or a new traffic value of a first service flow is transmitted through out-of-band signaling or a low-delay packet, thereby reducing a data transmission delay between a CP and an RP, and further improving the network traffic control performance.

Figure 4:
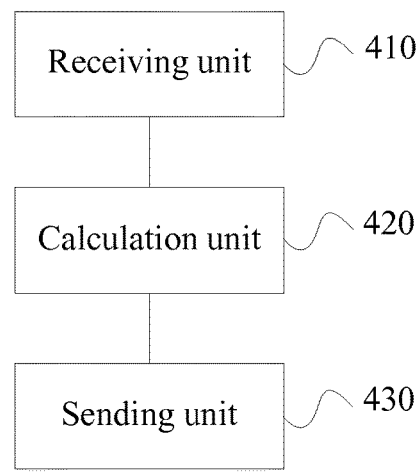
FIG. 4 is a schematic diagram of a traffic control device of this application.

Corresponding to the foregoing method, an embodiment of this application further provides a traffic control device. As shown in FIG. 4, the device includes a number of devices. A receiving unit 410 is configured to receive traffic monitoring information of a first service flow reported by a reaction point RP. A calculation unit 420 is configured to, when a congestion state of a first service flow of a congestion point CP satisfies a congestion condition, determine an RP needing traffic adjustment from one or more designated RPs according to the received traffic monitoring information of the first service flow reported by the RP, and calculate, according to the traffic monitoring information received by the receiving unit, a new traffic value of a first service flow of each of the RP needing traffic adjustment, where the designated RP has a traffic monitoring function. A sending unit 430 is configured to send each new traffic value of a first service flow calculated by the calculation unit to a corresponding RP needing traffic adjustment, so that the RP performs traffic control on the first service flow of the RP according to the new traffic value.

The calculation unit 420 may include a first selection sub-unit, configured to select a preset number of RPs from the designated RP according to a priority, and use the selected preset number of RPs as the RP needing traffic adjustment; or a second selection sub-unit, configured to select RPs of a preset ratio of the total number of designated RPs from the designated RP according to a priority, and use the selected RPs of the preset ratio as the RP needing traffic adjustment.

In an embodiment, the designated RP is an RP that is configured with a CIR value and a PIR value, that is, in addition that the designated RP has a traffic monitoring function, and the designated RP is further configured with a CIR value and a PIR value. In this embodiment, the calculation unit 420 may include the third selection sub-unit, configured to, for each designated RP, determine whether traffic of a first service flow of the RP is greater than a CIR of the RP, and select an RP with traffic of the first service flow greater than the CIR as the RP needing traffic adjustment.

The traffic monitoring information includes: a cache status of a queue corresponding to the first service flow of the RP; and the calculation unit 420 may include a fourth selection sub-unit, configured to, from the RP that reports the traffic monitoring information of the first service flow, select an RP with a cache status of a queue being overflowing as the RP needing traffic adjustment.

The traffic monitoring information includes: traffic of the first service flow; and the calculation unit 420 may further include a first calculation sub-unit, configured to calculate a ratio of an inflow rate of the first service flow to a maximum outbound bandwidth of the first service flow of the CP, calculate a product of traffic reported by the RP needing traffic adjustment and the ratio, and use the product as a new traffic value of a first service flow of the RP needing traffic adjustment; or a second calculation sub-unit, configured to calculate a first difference between a maximum outbound bandwidth of the first service flow of the CP and a sum of traffic of first service flows of all non-designated RPs, and calculate a second difference between an inflow rate of the first service flow of the CP and the sum of the traffic of the first service flows of all the non-designated RPs, calculate a ratio of the first difference to the second difference, and use a product, which is obtained by multiplying traffic reported by the RP needing traffic adjustment by the ratio, as a new traffic value of a first service flow of the RP needing traffic adjustment.

In an implementation manner of the embodiment of this application, the designated RP is an RP that is configured with both a committed information rate CIR value and a peak information rate PIR value, and has a traffic monitoring function.

When the designated RP is configured with a CIR value and a PIR value, the sending unit sends each new traffic value of a first service flow calculated by the calculation unit to a corresponding RP needing traffic adjustment, so that the RP that receives the new traffic value re-configures its CIR value and PIR value according to the received new traffic value, so as to perform traffic control on the first service flow. For example, the CIR value and the PIR value in the PR may be both configured to the new traffic value received by the RP and sent by the sending unit. The foregoing description is merely an example of configuring a CIR value and a PIR value of each RP according to a new traffic value, and it may be understood that, there are many configuration manners, which are not limited in the present invention.

Traffic monitoring information of a first service flow reported by an RP is received; when a congestion state of a first service flow of a CP satisfies a congestion condition, an RP needing traffic adjustment is determined from one or more designated RPs, and a new traffic value of a first service flow of each of the RP needing traffic adjustment is calculated according to the traffic monitoring information, where the designated RP has a traffic monitoring function; and each calculated new traffic value of a first service flow is sent to a corresponding RP needing traffic adjustment, so that the RP performs traffic control on the first service flow of the RP according to the new traffic value. In this way, in the embodiment of this application, an RP needing traffic adjustment is selected only from one or more designated RPs, and compared with randomly selecting an RP in the prior art, the selected RP needing traffic adjustment is more accurate, thereby improving network traffic control performance; moreover, and a new traffic value of a first service flow of each of the RP needing traffic adjustment is calculated according to the traffic monitoring information, so that the RP performs traffic control on the first service flow of the RP according to the new traffic value, and compared with that the selected RP decreases traffic according to a certain fixed algorithm in the prior art, traffic control in the RP is more accurate, and at the same time, the network traffic control performance is improved.

This application further provides a data exchange network, where the network includes a reaction point RP and a congestion point CP, where the reaction point RP is configured to report traffic monitoring information of a first service flow to the congestion point CP; and receive a new traffic value of the first service flow sent by the congestion point CP, and perform traffic control on the first service flow of the reaction point RP according to the new traffic value; and the congestion point CP is configured to receive the traffic monitoring information of the first service flow reported by the reaction point RP; when a congestion state of a first service flow of the congestion point CP satisfies a congestion condition, determine a reaction point RP needing traffic adjustment from a designated reaction point RP according to the received traffic monitoring information of the first service flow reported by the reaction point RP, and calculate, according to the traffic monitoring information, a new traffic value of a first service flow of each of the reaction point RP needing traffic adjustment, where the designated reaction point RP has a traffic monitoring function; and send each calculated new traffic value of a first service flow to a corresponding reaction point RP needing traffic adjustment, so that the reaction point RP performs traffic control on the first service flow of the reaction point RP according to the new traffic value.

In a possible implementation manner of the embodiment of this application, the designated RP is an RP that is configured with both a committed information rate CIR value and a peak information rate PIR value, and the RP has a traffic monitoring function.

In a data network provided in the embodiment of the present invention, a CP may be integrated with the traffic control device described in the foregoing embodiment.

Finally, a method for configuring a CP and an RP in the data exchange network is described by taking the Ethernet as an example.

Figure 5:
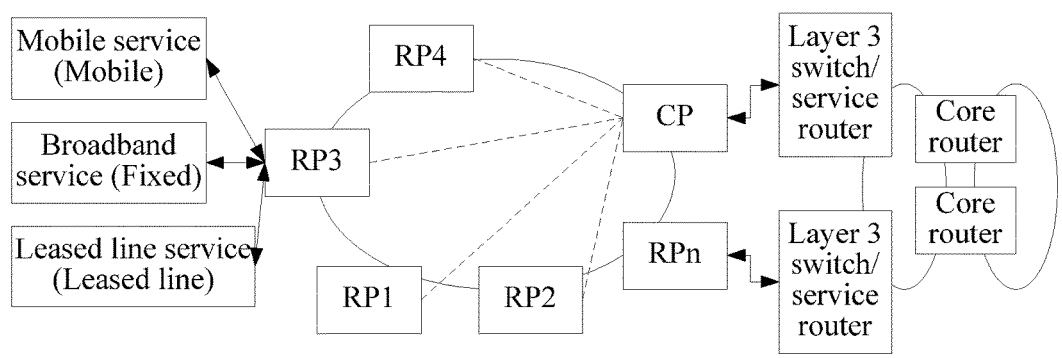
FIG. 5 is a schematic diagram of configuration of a CP and RPs of a metropolitan OTN network.

For example, a metropolitan OTN network shown in FIG. 5 includes: a metropolitan network access point (layer 3 switch, L3SW, as shown in FIG. 5) and a service processing point (service router, SR, as shown in FIG. 5). Each node in the metropolitan OTN network is integrated with an OTN function and an Ethernet switching function.

When a CP and a corresponding RP in the metropolitan OTN network are configured, a service aggregation node in the network may be generally selected as the CP, and as shown in FIG. 5, a node connected to the service processing point may be selected as the CP. After the CP is determined, a corresponding RP needs to be configured, and one CP may be configured with multiple RPs. The RP may be automatically selected by a network management system or selected manually according to network topology and service configuration information. Specifically, the RP is selected according to service traffic and service connection quantity of a node, for example, a node with service traffic greater than a line rate by 50% or more or a node with service connection quantity greater than average quantity. In addition, a node through which a certain service connection passes may also be selected as the RP, and is dedicatedly used to perform traffic control on this stream.

Persons of ordinary skill in the art may understand that the process of the method according to the foregoing embodiments may be implemented by a program instructing relevant hardware. The program may be stored in a readable storage medium. When the program is run, corresponding steps of the foregoing method are performed. The storage medium may be a ROM/RAM, a magnetic disk, an optical disk, and so on.

The foregoing descriptions are only exemplary embodiments of this application. It should be noted that, improvements and modifications may also be made by persons of ordinary skill in the art without departing from the principle of this application, and these improvements and modifications shall also fall within the protection scope of this application.

What is claimed is:

1. A method for controlling traffic in a computer network, the method comprising:
   receiving, by a network device that is a congestion point (CP), traffic monitoring information of a first service flow reported by a first reaction point (RP), the computer network comprising the first RP and one or more designated RPs that are each a device that is separate from the CP, that has a traffic monitoring function, and that communicates with the CP over a network link, and wherein the CP stores configuration information about a CIR (Committed Information Rate) and a PIR (Peak Information Rate) of each of the one or more designated RPs;
   determining that a congestion state of the first service flow of the CP satisfies a congestion condition;
   determining, in response to determining that the congestion condition is satisfied, a second RP needing traffic adjustment from the one or more designated RPs according to the traffic monitoring information of the first service flow reported by the first RP;
   calculating, by the CP, according to the traffic monitoring information, a new traffic value for a sending rate of a data stream of the first service flow of the second RP needing traffic adjustment according to at least a sum of traffic of first service flows of all non-designated RPs, wherein each of the non-designated RPs are a device that is separate from the CP and that communicates with the CP over a network link, and wherein the CP stores no configuration information about the PIR of each of the non-designated RPs; and
   transmitting, by the network device, the new traffic value corresponding to the second RP needing traffic adjustment, wherein the second RP performs traffic control on the first service flow according to the new traffic value.

2. The method according to claim 1, wherein determining the second RP needing traffic adjustment comprises selecting a preset number of RPs from the one or more designated RPs according to a priority, and using the selected preset number of RPs as the second RP needing traffic adjustment.

3. The method according to claim 1, wherein determining the second RP needing traffic adjustment comprises selecting RPs of a preset ratio of the total number of designated RPs from the one or more designated RPs according to a priority, and using the selected RPs of the preset ratio as the second RP needing traffic adjustment.

4. The method according to claim 1, wherein determining the second RP needing traffic adjustment comprises, for each designated RP, determining whether traffic of the first service flow of the designated RP is greater than a CIR of the designated RP, and selecting an RP with traffic of the first service flow greater than the CIR as the second RP needing traffic adjustment.

5. The method according to claim 1, wherein the second RP performs traffic control on the first service flow of the second RP according to the new traffic value, which comprises configuring a CIR and/or a PIR of the second RP to the new traffic value.

6. The method according to claim 1, wherein the traffic monitoring information comprises a cache status of a queue corresponding to the first service flow of the first RP and wherein determining the second RP needing traffic adjustment comprises selecting an RP from the one or more designated RPs with a cache status of a queue being overflowing as the second RP needing traffic adjustment.

7. The method according to claim 1, wherein the traffic monitoring information comprises traffic of the first service flow and wherein calculating the new traffic value of a first service flow of the second RP needing traffic adjustment comprises:
   calculating a ratio of an inflow rate of the first service flow to a maximum outbound bandwidth of the first service flow of the CP;
   calculating a product of a traffic reported by the second RP needing traffic adjustment and the ratio; and
   using the product as a new traffic value of a first service flow of the second RP needing traffic adjustment.

8. The method according to claim 1, wherein the traffic monitoring information comprises traffic of the first service flow and wherein calculating the new traffic value of the first service flow of the second RP needing traffic adjustment comprises:
   calculating a first difference between a maximum outbound bandwidth of the first service flow of the CP and a sum of traffic of first service flows of all of the non-designated RPs;
   calculating a second difference between an inflow rate of the first service flow of the CP and a sum of the traffic of the first service flows of all the non-designated RPs;
   calculating a ratio of the first difference to the second difference; and
   using a product, which is obtained by multiplying traffic reported by the second RP needing traffic adjustment by the ratio, as the new traffic value of the first service flow of the second RP needing traffic adjustment.

9. The method according to claim 1, wherein the traffic monitoring information of the first service flow is transmitted through out-of-band signaling or a low-delay packet.

10. The method according to claim 1, wherein a new traffic parameter of the first service flow is transmitted through out-of-band signaling or a low-delay packet.

11. The method according to claim 1, wherein the second RP performs traffic control on the first service flow according to the new traffic value, which comprises decreasing, by the second RP, traffic of the first service flow to the new traffic value.

12. The method according to claim 1, wherein the traffic monitoring information of the first service flow is transmitted through out-of-band signaling on a network link.

13. A computer network traffic control device, comprising:
   a processor; and
   a non-transitory computer readable medium having a plurality of computer executable instructions stored thereon which, when executed by the processor, cause the processor to:
      receive traffic monitoring information of a first service flow reported by a first reaction point (RP), wherein the computer network traffic control device is a congestion point (CP) in a computer network, and wherein the computer network further comprises the first RP and one or more designated RPs that are each a device that is separate from the CP, that has a traffic monitoring function, and that communicates with the CP over a network link, and wherein the CP stores configuration information about a CIR (Committed Information Rate) and a PIR (Peak Information Rate) of each of the one or more designated RPs,
      determining that a congestion state of the first service flow of the CP satisfies a congestion condition,
      determine, in response to determining that the congestion condition is satisfied, a second RP needing traffic adjustment from the one or more designated RPs according to the traffic monitoring information of the first service flow reported by the first RP,
      calculate, according to the received traffic monitoring information, a new traffic value for a sending rate of a data stream of the first service flow of the second RP needing traffic adjustment according to at least a sum of traffic of first service flows of all non-designated RPs, wherein each of the non-designated RPs are a device that is separate from the CP and that communicates with the CP over a network link, and wherein the CP stores no configuration information about the PIR of each of the non-designated RPs, and
      transmit the new traffic value corresponding to the second RP needing traffic adjustment, wherein the second RP performs traffic control on the first service flow according to the new traffic value.

14. The device according to claim 13, wherein the computer executable instructions comprise instructions cause the processor to select a preset number of RPs from the designated RP according to a priority, and use the selected preset number of RPs as the second RP needing traffic adjustment.

15. The device according to claim 13, wherein the computer executable instructions comprise instructions cause the processor to select RPs of a preset ratio of the total number of designated RPs from the designated RP according to a priority, and use the selected RPs of the preset ratio as the second RP needing traffic adjustment.

16. The device according to claim 13, wherein the computer executable instructions comprise instructions cause the processor to, for each designated RP, determine whether traffic of the first service flow of the designated RP is greater than a CIR of the designated RP, and select an RP with traffic of the first service flow greater than the CIR as the second RP needing traffic adjustment.

17. The device according to claim 13, wherein the traffic monitoring information comprises: a cache status of a queue corresponding to the first service flow of the first RP and wherein the computer executable instructions comprise instructions cause the processor to select an RP from the one or more designated RPs with a cache status of a queue being overflowing as the second RP needing traffic adjustment.

18. The device according to claim 13, wherein the computer executable instructions comprise instructions cause the processor to:
   calculate a ratio of an inflow rate of the first service flow to a maximum outbound bandwidth of the first service flow in the CP, calculate a product of traffic reported by the second RP needing traffic adjustment and the ratio, and use the product as the new traffic value of the first service flow of the second RP needing traffic adjustment; or
   calculate a first difference between a maximum outbound bandwidth of the first service flow of the CP and a sum of traffic of first service flows of all non-designated RPs, and calculate a second difference between an inflow rate of the first service flow of the CP and a sum of the traffic of the first service flows of all the non-designated RPs, calculate a ratio of the first difference to the second difference, and use a product, which is obtained by multiplying traffic reported by the second RP needing traffic adjustment by the ratio, as a new traffic value of a first service flow of the second RP needing traffic adjustment.

19. The computer network traffic control device of claim 13, wherein the instructions to receive the traffic monitoring information of the first service flow reported by the first RP include instructions to receive the traffic monitoring information from the first RP using out-of-band signaling on a network link.

20. A data exchange computer network, comprising:
   a first network device that is a first reaction point (RP);
   a second network device that is a congestion point (CP); and
   one or more designated RPs having a traffic monitoring function, and that are each a device that is separate from the CP, that has a traffic monitoring function, and that communicates with the CP over a network link,
   wherein the first RP is configured to:
      transmit traffic monitoring information of a first service flow to the CP,
      receive a new traffic value of the first service flow sent by the CP, and
      perform traffic control on the first service flow of the RP according to the new traffic value, and
   wherein the CP is configured to:
      store configuration information about a CIR (Committed Information Rate) and a PIR (Peak Information Rate) of each of the one or more designated RPs
      receive the traffic monitoring information of the first service flow reported by the first RP,
      determine that a congestion state of the first service flow of the CP satisfies a congestion condition,
      determine, in response to determining that the congestion condition is satisfied, a second RP needing traffic adjustment from the one or more designated RPs according to the traffic monitoring information of the first service flow reported by the first RP, wherein the second RP is a third network device in the data exchange computer network,
      calculate, according to the traffic monitoring information, a new traffic value for a sending rate of a data stream of the first service flow of the second RP needing traffic adjustment according to at least a sum of traffic of first service flows of all non-designated RPs, wherein each of the non-designated RPs are a device that is separate from the CP and that communicates with the CP over a network link, and wherein the CP stores no configuration information about the PIR of each of the non-designated RPs, and transmit the new traffic value corresponding to the second RP needing traffic adjustment, wherein the second RP performs traffic control on the first service flow according to the new traffic value.

* * * * *